United States Patent [19]

Kepple

[11] Patent Number: 4,681,434
[45] Date of Patent: Jul. 21, 1987

[54] DUAL SPECTRA OPTICAL PYROMETER HAVING A SERIAL ARRAY OF PHOTODETECTORS

[75] Inventor: Dean A. Kepple, Jupiter, Fla.

[73] Assignee: United Technologies Corporation, Hartford, Conn.

[21] Appl. No.: 798,213

[22] Filed: Nov. 14, 1985

[51] Int. Cl.⁴ ............................................. G01J 5/18
[52] U.S. Cl. ...................................... 356/45; 374/127
[58] Field of Search .......................... 356/43, 44, 45; 374/120, 121, 127; 350/582, 587, 589

[56] References Cited

U.S. PATENT DOCUMENTS 3,454,769  7/1969  Dynes ................................ 374/127
4,222,663  9/1980  Strange ............................. 356/45

OTHER PUBLICATIONS

T. G. R. Beynon, "Radiation Thermometry Applied to the Development and Control of Gas Turbine Engines", *American Institute of Physics*, 1982, pp. 471-477.
W. H. Atkinson, R. R. Strange, "Pyrometer Temperature Measurements in the Presence of Reflected Radiation", *Proceedings of the Conference of the American Society of Mechanical Engineers*, Aug. 1976, pp. 1-8.

Primary Examiner—Eugene R. LaRoche
Assistant Examiner—Robert J. Pascal
Attorney, Agent, or Firm—J. Kevin Grogan

[57] ABSTRACT

A novel dual spectra optical pyrometer is characterized by a serial array of photodetectors. The first photodetector absorbs a spectral portion of a target optical beam incident thereto, and passes the remainder optical beam to the second photodetector. Signals from both photodetectors are provided along with signals indicative of the first detector's spectral absorption and an estimate of the equivalent black body temperature of a fireball to a signal processor which provides a compensated temperature signal therefrom.

3 Claims, 3 Drawing Figures ized by a first detector contained within

DUAL SPECTRA OPTICAL PYROMETER HAVING A SERIAL ARRAY OF PHOTODECTECTORS

DESCRIPTION

1. Technical Field

This invention relates to optical pyrometers and more particularly to dual spectra optical pyrometers having a serial array of photodetectors.

2. Background Art

Optical pyrometers are well known and have found widespread use in aircraft engine applications. Dual spectra optical pyrometers have been used to measure the temperature of turbine blades in an operating jet engine. By utilizing two spectral bands the pyrometer can provide the needed discrimination between the optical energy emitted by the blade and the reflected energy of the combustion flame.

In the dual spectra optical pyrometer disclosed by Gebhart, et al in U.S. Pat. No. 4,222,663 light from a turbine blade is provided to two pyrometers having different spectral bands whose outputs are subsequently processed to provide an estimate of the magnitude of the reflected energy. Typically, silicon photodetectors are used for both pyrometers and therefore possess the same intrinsic spectral band. An optical filter whose passband is a portion of silicon is positioned in the optical path of one of the beams to generate a spectral band difference between the two pyrometers. In dual spectra optical pyrometers of the prior art the spectral bands of the first unfiltered pyrometer comprises 0.4 to 1.1 microns and comprises 0.4 to 0.85 microns for the second, filtered pyrometer.

The use of two detectors made from similar spectral band materials also requires additional optical components to split the received light and guide the two beams. These additional optical components must be precisely aligned and remain free of contamination in the severe environment of a jet engine. Moreover, the reflection losses from these optical components further attenuate the weak, short wavelength light. The limited optical energy available at the short wavelengths results in a poor signal-to-noise ratio in the electrical signals provided by the photodetectors. This problem is exacerbated by the total overlap in spectral bands which occurs when silicon is used for both photodetectors.

DISCLOSURE OF INVENTION

An object of the present invention is to provide a dual spectra optical pyrometer characterized by a serial array detector module.

According to the present invention, a dual spectra optical pyrometer having a serial array detector module used to measure the temperature of a remote target comprises an optical guide for receiving from the target an optical beam that has a spectral width and has an emitted component from the target and a reflected component from a fireball having an estimated equivalent black body temperature. A housing is adapted to receive the optical guide. The dual spectra optical pyrometer is characterized by a first detector contained within the housing for receiving the target optical beam and absorbing therefrom a first optical component having a spectral width selected to be a portion of the target beam spectral width and passing therethrough an optical beam remainder. The first detector provides an electrical signal equivalent of the first optical component. A second detector is also contained within the housing and receives the optical beam remainder and provides a second electrical signal equivalent thereof. Also included in the pyrometer is a signal processor which receives the first and second detector signals and also receives signals indicative of the first component spectral width and an estimate of the equivalent black body fireball temperature. The signal processor generates a temperature signal indicative of an equivalent black body temperature from the first electrical signal and generates from the second detector signal a temperature signal indicative of an equivalent black body temperature. In addition, the signal processor provides a temperature correction signal from the difference of the first and the second temperature signals in dependence on signals indicative of the estimated fireball equivalent black body temperature and first component spectral width. The signal processor provides a compensated temperature signal from the difference between the first temperature signal and the temperature correction signal.

BEST MODE FOR CARRYING OUT THE INVENTION

Figure 1:
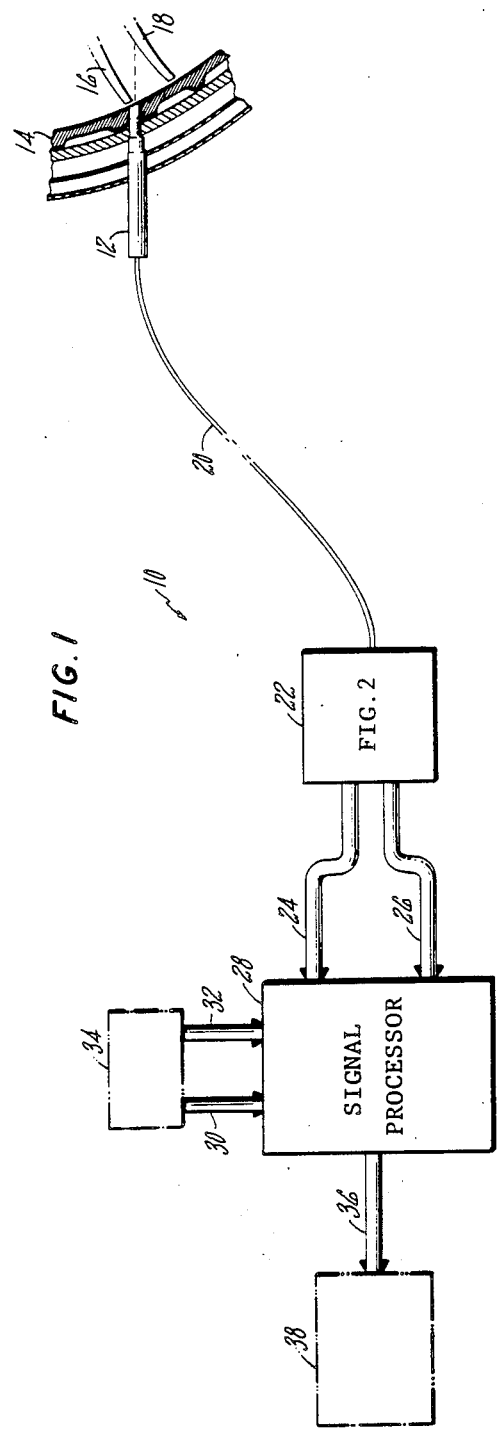
FIG. 1 is an illustration of a simplified block diagram of a dual spectra optical pyrometer having a serial array detector module provided according to the present invention.

Referring first to FIG. 1, in an illustration of a simplified block diagram of a dual spectra pyrometer having a serial array detector module provided according to the present invention, a dual spectra pyrometer 10 includes probe 12 mounted in casing 14 of a jet engine. The probe should be positioned to optically view a target such as rotating turbine blades 16 and 18.

In an operating jet engine the blades of the turbine reach an elevated temperature. As such they emit radiation, the spectral distribution of which is a function of temperature and can usually be approximated by the well known "black body" approximation or "grey body" approximation if emissivity correction is included. In addition, light from the jet engine combustion flame or fireball is reflected off the turbine blade and also comprises part of the target optical beam. The temperature of the fireball is substantially higher than that of the turbine blade, and as a result, the sum of the two beams produces an equivalent black body spectral energy distribution which yields a temperature much higher than the actual temperature of the turbine blade.

The radiation from the turbine blades comprises a target optical beam having a spectral width which is collected by the probe. The probe may include lenses and other conventional optical components. In other aspects, the probe is of a conventional design and includes such elements as a housing for the optical fiber, and provisions for purge gas flow through the probe housing. The components of the probe described hereinabove are used in a typical diagnostic pyrometer. Those skilled in the art will recognize that substitutions and modifications can be made depending upon the pyrometer's use as a diagnostic or in-flight pyrometer, and depending on each engine type.

The target optical beam is received by an optical guide 20 secured inside the probe by conventional techniques. The guide is conventional and typically comprises a fused fiber optic bundle of conventional wide band quartz or fused silica type, such as an Ensign Bickford Optics HC-414-lu fiber. As detailed hereinafter with respect to FIG. 2 the target optical beam is provided to detection module 22. In the best mode embodiment the detection module comprises a first photodetector absorbing a first component of the target beam having a spectral width selected to be a portion of the target optical beam and transmitting therethrough the remainder of the target optical beam. Also included is a second photodetector serially positioned thereafter, absorbing the remainder optical beam. The serial positioning of the second photodetector relative to the first produces spectral band division between the two as the first photodetector filters the radiation provided to the second photodetector. With a detection module provided according to the present invention, coupling efficiencies into the two photodetectors are almost 100% of the entire respective spectral ranges.

The first photodetector provides signals on lines 24 which are indicative of the received energy of first component beam and comprises a first signal channel whose spectral band corresponds to that of first component beam. Similarly, the second photodetector comprises a second signal channel whose spectral band is limited to that of the remainder optical beam and provides signals on lines 26 indicative thereof.

These signals are received by signal processor 28 which is a type known in the art and in the best mode embodiment includes appropriate conventional analog electrical circuits. In addition, the signal processor receives signals on lines 30 and lines 32 from external processing apparatus 34 not shown and not a part of the present invention that are indicative of the spectral range of the first photodetector signals and an estimate of equivalent black body temperature of the fireball or combustion flame.

The signals from the first photodetector are processed to provide a signal indicative of an equivalent black body temperature for the first signal channel. The signal processor performs the same function for the second photodetector signals, yielding signals indicative of an equivalent black body temperature for the second signal channel.

The signal processor computes temperature correction signals ($T_c$) and provides compensated temperature signals ($T_t$) on lines 36 to external signal processor 38 by relating the temperature correction signals to the second temperature signals such that $$T_t = T_u - T_c \quad (1)$$

In order to accurately compute temperature correction signals, the signal processor must receive (1) the first and second temperature signals, (2) signals indicative of the spectral width of the first signal channel, and (3) signals indicative of an estimate of the equivalent black body temperature of the fireball. In addition, temperature correction signals are a function of the percent of reflected energy in the target optical beam, a parameter often expressed as the difference between the first temperature ($T_l$) and the second temperature ($T_2$) or ($T_l - T_2$).

As is well known in the art, the percent reflected energy in the target beam can vary from 0 to 50% before rendering the pyrometer output signals unacceptable, given only an estimate of the equivalent black body temperature of the combustion flame. As a result, there is a functional relationship between the magnitude of the temperature correction ($T_c$) signal and the percent of reflected energy ($T_l - T_2$), for a given second photodetector temperature signal magnitude.

With only an estimated fireball equivalent black body temperature, the error in the temperature correction signal is small when the percent reflected energy is less than 50%. For example, given an estimated fireball temperature of 4500° F., and a 50% reflected energy component, the magnitude of error is less than approximately 30° F., even though the estimated fireball temperature can be off by 300° F. Continuing with the example, if the percent reflected energy is less than 50%, the family of curves ($T_c$ v. ($T_l - T_2$)) resulting from multiple values of second photodetector temperature signals can be approximated by a single equation using conventional curve fitting techniques, yielding $$T_t = T_2 - [(0.3 T_2 - 150/(3500 - T_u)](T_2 - T_1)^{1.28} \quad (2)$$

where, $T_t$ is the compensated temperature, and $T_l$, $T_2$ are as indicated hereinabove.

Those skilled in the art will note that other empirically derived equations can be obtained for other fireball equivalent black body temperatures.

Moreover, it is also apparent to those skilled in the art that alternative algorithms employing either analog or digital means can be substituted. Specifically, a digital embodiment of the signal processor includes a high speed computer with conventional computer-memory and analog-to-digital convention, which generates and stores in memory temperature correction signals similar to those described hereinabove in conventional lookup table format, with compensated temperature signals obtainable therefrom by conventional techniques.

Figure 2:
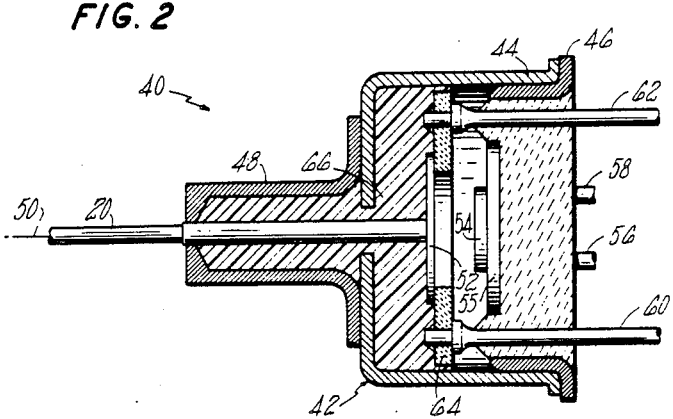
FIG. 2 is a sectioned illustration of a serial array detector module for use in the optical pyrometer of FIG. 1.

FIG. 2 is a sectioned illustration of a serial array photodetector module for use with the dual spectra optical pyrometer of FIG. 1. The serial array photodetector module 40 includes housing 42 which is of a conventional type such as a TO-5 or TO-8 including metal header 46 and case 44 that have been appropriately modified. The housing also includes waveguide connector 48 which is attached by conventional techniques to the case. In the best mode embodiment the case has been modified by drilling a hole through the center so that the optical fiber (20, FIG. 1) is attached to the waveguide connector and can pass therethrough, defining optic axis 50.

Positioned on the header is a serial detector array comprising photodetectors 52 and 54. Photodetector 54 is mounted by conventional techniques to the header. To enhance long wavelength responsivity, a metal layer 55 is fabricated underneath photodetector 54. Electrodes 56 and 58 are only partially shown and provide electrical contact with photodetector 54 mounted along the optic axis. In addition, the case has provision for insulated standoff electrodes 60 and 62 which pass through the header allowing ceramic washer 64 to be positioned coaxially with the optic axis, immediately above photodetector 54. The ceramic washer is of a conventional type and has an annular opening. Photodetector 52 is mounted on the ceramic washer directly over the opening by conventional techniques approximately parallel to photodetector 54. Electrical contact is provided to photodetector 52 through electrodes 60 and 62 by conventional techniques, including in the best mode embodiment, metallic contacts fabricated on the top surface of the ceramic washer.

The metal case is slid over the header positioning the optical fiber in substantial contact with photodetector 52 such that the target optical beam exits the optical fiber, and is provided thereto absorbing from the target optical beam a first component thereof. The remainder of the target optical beam passes through photodetector 52 and is provided to photodetector 54. A conventional encapsulant 66 such as a silicone epoxy is used in the gap between the header and case and the optical fiber thereby sending out moisture and other contaminants. In the best mode embodiment photodetector 52 comprises silicon, while photodetector 54 comprises indium gallium arsenide.

Figure 3:
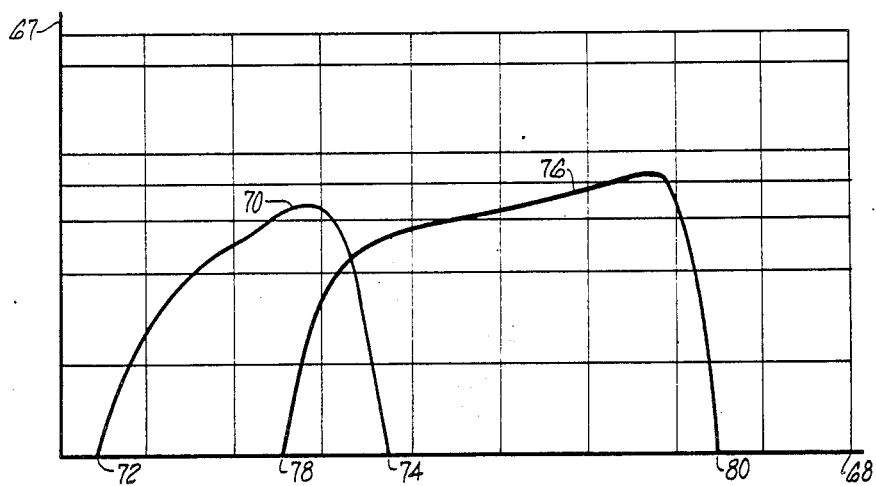
FIG. 3 is a drawing illustrating the responsivity characteristics of the photodetector materials used in the detector module of FIG. 2.

FIG. 3 is a drawing illustrating the responsivity characteristics of silicon and indium gallium arsenide which are used as photodetector materials in the best mode embodiment of the detector module of FIG. 2. Axes 67 and 68 correspond to logarithmic output current per incident power versus wavelength respectively.

Dual spectra optical pyrometers of the prior art usually have photodetectors comprised of silicon. Silicon photodetectors are reliable as well as inexpensive, and display little drift in performance as a function of temperature.

Overlap in the spectral bands which results by using the same material for both photodetectors creates inherent performance limitations. The signal-to-noise ratio is limited because most of the energy in the target optical beam is at wavelengths longer than those absorbed by silicon. Moreover, the component of the target beam reflected off of the turbine blade has a very weak intensity; the overlap between spectral bands further reduces available signal-to-noise ratios.

The serial array photodetector module provided according to the present invention not only has the advantages of mechanical stability and fewer optical components, but the negligible overlap between the responsivity of the photodetector materials ensures inherently greater signal-to-noise ratios.

In the best mode embodiment, the first photodetector in the serial array comprises silicon. As indicated hereinabove with respect to FIG. 2, when the target optical beam is incident on the first photodetector (52, FIG. 2), the silicon will substantially absorb that portion thereof having wavelengths between 0.4 and 1.05 microns as indicated by curve 70, intercept points 72 and 74 corresponding to 0.4 and 1.05 microns respectively. The remainder of the target optical beam will pass through the silicon and be provided to the second photodetector (54, FIG. 2) which is responsive to light having wavelengths between 1.05 and 1.8 microns shown by curve 76, with intercept points 78 and 80 corresponding to 0.8 and 1.8 microns respectively. In the best mode embodiment photodetector 54 comprises an indium gallium arsenide photodiode which is selected because of its responsivity and high frequency response plus a relatively low dark current and noise at moderate ambient temperatures. Those skilled in the art will note that other infrared detecting materials, such as germanium, may be substituted.

In addition, the serial array photodetecting module provided hereinabove has improved high frequency response because it possesses efficient radiant power signal transfer between the optical fiber and the photodetectors. Photodetector 52 receives a total radiant optical power exiting the waveguide except for a small coupling loss at the optical fiber detector interface. Photodetector 54 receives approximately all of the incident power from approximately 1.05 microns to the upper limit of its responsivity range, approximately 1.8 microns in the best mode embodiment. This includes over 75% of the highest output portion of its response range, enhancing the pyrometer's overall signal-to-noise performance.

Similarly, although the invention has been shown and described with respect to a best mode embodiment thereof, it should be understood by those skilled in the art that various other changes, omissions and additions thereto may be made therein without departing from the spirit and scope of the invention.

I claim:

1. A dual spectra optical pyrometer having a serial array photodetector module for measuring the temperature of a remote target, comprising:

optical guide means for receiving from the target an optical beam having a spectral width and having an emitted component from the target and a reflected component from a fireball having a temperature, housing means adapted to receive said optical guide, first photodetector means contained within said housing means absorbing from said target optical beam a first optical component having a spectral width selected to be a portion of the target beam spectral width and passing therethrough an optical beam remainder, said first detector means providing an electrical signal equivalent of said first optical component, second photodetector means contained within said housing means receiving said optical beam remainder and providing a second electrical signal equivalent thereof, signal processing means receiving said first and second detector signals and further receiving signals indicative of said first component spectral width and an estimate of said fireball equivalent black body temperature, said signal processing means
generating from said first photodetector signal a temperature signal indicative of an equivalent black body temperature,
generating from said second photodetector signal a temperature signal indicative of an equivalent black body temperature,
generating from the difference of said first temperature signal and said second temperature signal a temperature correction signal in dependence on said estimated fireball equivalent black body temperature signal and said first component spectral width signal,
providing a corrected temperature signal from the difference between said first temperature signal and said temperature correction signal.

2. The dual spectra optical pyrometer of claim 1, wherein said first photodetector means comprises silicon.

3. The dual spectra optical pyrometer of claim 1, wherein said second photodetector means comprises indium gallium arsenide.

* * * * *